United States Patent
Muendel et al.

(10) Patent No.: US 11,777,273 B2
(45) Date of Patent: Oct. 3, 2023

(54) FEMTOSECOND PULSE STRETCHING FIBER OSCILLATOR

(71) Applicant: Lumentum Operations LLC, San Jose, CA (US)

(72) Inventors: Martin H. Muendel, Oakland, CA (US); Simonette Pierrot, Dietikon (CH)

(73) Assignee: Lumentum Operations LLC, San Jose, CA (US)

( * ) Notice: Subject to any disclaimer, the term of this patent is extended or adjusted under 35 U.S.C. 154(b) by 0 days.

(21) Appl. No.: 17/582,505

(22) Filed: Jan. 24, 2022

(65) Prior Publication Data

US 2022/0149580 A1 May 12, 2022

Related U.S. Application Data

(62) Division of application No. 16/694,741, filed on Nov. 25, 2019, now Pat. No. 11,233,372.

(Continued)

(51) Int. Cl.
*H01S 3/1118* (2023.01)
*H01S 3/067* (2006.01)
(Continued)

(52) U.S. Cl.
CPC .......... *H01S 3/1118* (2013.01); *H01S 3/0675* (2013.01); *H01S 3/06791* (2013.01);
(Continued)

(58) Field of Classification Search
CPC ..... H01S 3/06791; H01S 3/067–06795; H01S 3/08004–08009; H01S 3/0811–0812; H01S 3/1112–1118; H01S 3/0675
See application file for complete search history.

(56) References Cited

U.S. PATENT DOCUMENTS

| | | | |
|---|---|---|---|
| 5,450,427 A | | 9/1995 | Fermann et al. |
| 5,878,071 A | * | 3/1999 | Delavaux .............. H01S 3/1124 372/18 |

(Continued)

FOREIGN PATENT DOCUMENTS

| | | | | |
|---|---|---|---|---|
| CN | 1124425 A | * | 6/1996 | ......... H01S 3/06754 |
| CN | 1774662 A | | 5/2006 | |

(Continued)

OTHER PUBLICATIONS

Paschotta R., "Mode Locking," RP Photonics Encyclopedia, 7 pages, [retrieved on Oct. 7, 2019] Retrieved from the internet [URL: https://www.rp-photonics.com/mode_locking.html].

(Continued)

*Primary Examiner* — Joshua King
(74) *Attorney, Agent, or Firm* — Harrity & Harrity, LLP

(57) ABSTRACT

A pulse stretching fiber oscillator (or laser cavity) may comprise a chirped fiber Bragg grating (CFBG) and an optical circulator arranged such that a first portion of a beam that is transmitted through the CFBG continues to propagate through the laser cavity while a second portion of the beam that is reflected from the CFBG is stretched and chirped by the CFBG and directed out of the laser cavity by the optical circulator. Accordingly, a configuration of the CFBG and the optical circulator in the laser cavity may enable pulse stretching contemporaneous with outcoupling, which may prevent deleterious nonlinear phase from accumulating prior to stretching.

20 Claims, 4 Drawing Sheets

Related U.S. Application Data

(60) Provisional application No. 62/866,377, filed on Jun. 25, 2019.

(51) Int. Cl.
    *H01S 3/081*          (2006.01)
    *H01S 3/00*           (2006.01)

(52) U.S. Cl.
    CPC .......... *H01S 3/0811* (2013.01); *H01S 3/0812* (2013.01); *H01S 3/0057* (2013.01); *H01S 2301/04* (2013.01); *H01S 2301/085* (2013.01)

(56) References Cited

U.S. PATENT DOCUMENTS

| | | | |
|---|---|---|---|
| 6,198,568 B1 * | 3/2001 | Galvanauskas | H01S 3/0057 359/332 |
| 7,428,096 B2 | 9/2008 | Nakazawa et al. | |
| 7,444,049 B1 | 10/2008 | Kim et al. | |
| 7,558,302 B1 * | 7/2009 | Delfyett | H01S 5/50 359/344 |
| 7,777,940 B1 | 8/2010 | Delfyett et al. | |
| 8,189,971 B1 * | 5/2012 | Vaissie | H01S 3/0057 359/333 |
| 8,995,478 B1 * | 3/2015 | Kobtsev | H01S 3/06712 372/18 |
| 10,761,402 B2 | 9/2020 | Brinkmann et al. | |
| 11,233,372 B2 | 1/2022 | Muendel et al. | |
| 2003/0142393 A1 * | 7/2003 | Kuksenkov | H01S 3/06791 359/341.1 |
| 2006/0227816 A1 * | 10/2006 | Liu | H01S 3/06708 372/6 |
| 2007/0177642 A1 * | 8/2007 | Liu | H01S 3/1112 372/30 |
| 2008/0025348 A1 * | 1/2008 | Kuksenkov | H01S 3/1112 372/6 |
| 2009/0003391 A1 * | 1/2009 | Li | H01S 3/1118 372/6 |
| 2009/0174931 A1 * | 7/2009 | Huber | H01S 3/137 372/18 |
| 2010/0061408 A1 * | 3/2010 | Nakazawa | H01S 3/0675 372/6 |
| 2011/0044358 A1 | 2/2011 | Starodubov et al. | |
| 2012/0069860 A1 * | 3/2012 | Inbar | H01S 3/09415 372/6 |
| 2012/0147908 A1 * | 6/2012 | Simanovski | H01S 3/067 372/6 |
| 2014/0341237 A1 | 11/2014 | Pan et al. | |
| 2016/0097963 A1 | 4/2016 | Fermann et al. | |
| 2016/0352064 A1 | 12/2016 | Wise et al. | |
| 2020/0412077 A1 * | 12/2020 | Pierrot | H01S 3/1118 |
| 2020/0412081 A1 * | 12/2020 | Muendel | H01S 3/06791 |

FOREIGN PATENT DOCUMENTS

| | | | | |
|---|---|---|---|---|
| CN | 1774662 A | * | 5/2006 | ........... G02F 1/0553 |
| CN | 105633773 A | | 6/2016 | |
| CN | 105633773 A | * | 6/2016 | ......... H01S 3/06708 |
| CN | 106877121 A | | 6/2017 | |
| CN | 106877121 A | * | 6/2017 | ........... H01S 3/0057 |
| CN | 107181161 A | * | 9/2017 | ........... H01S 3/0675 |
| CN | 107181161 A | | 9/2017 | |
| CN | 108521065 A | | 9/2018 | |
| CN | 108521065 A | * | 9/2018 | ......... H01S 3/06712 |
| CN | 110994342 A | | 4/2020 | |
| CN | 110994342 A | * | 4/2020 | |
| CN | 111600186 A | | 8/2020 | |
| CN | 111600186 A | * | 8/2020 | ......... H01S 3/06716 |
| CN | 114421271 A | * | 4/2022 | |
| DE | 19635919 A1 | * | 3/1997 | ........... H01S 3/0675 |
| EP | 3300191 A1 | * | 3/2018 | ........... G02F 1/3523 |
| EP | 3300191 A1 | | 3/2018 | |
| JP | 08213680 A | * | 8/1996 | ........... H01S 3/0675 |
| JP | H08213680 A | | 8/1996 | |
| JP | H10256633 A | * | 9/1998 | |
| WO | 9948176 A1 | | 9/1999 | |
| WO | WO-9948176 A1 | * | 9/1999 | ............. H01S 3/302 |
| WO | 03043149 A1 | | 5/2003 | |
| WO | WO-03043149 A1 | * | 5/2003 | ........... H01S 3/0675 |
| WO | 03096106 A1 | | 11/2003 | |
| WO | WO-03096106 A1 | * | 11/2003 | ............. H01S 3/101 |
| WO | 2012112253 A2 | | 8/2012 | |
| WO | WO-2012112253 A2 | * | 8/2012 | ......... B23K 26/0066 |
| WO | 2013061708 A1 | | 5/2013 | |
| WO | WO-2013061708 A1 | * | 5/2013 | ......... G01B 9/02091 |
| WO | 2015189779 A2 | | 12/2015 | |
| WO | WO-2015189779 A2 | * | 12/2015 | ........... H01S 3/0675 |
| WO | 2018091552 A1 | | 5/2018 | |
| WO | WO-2018091552 A1 | * | 5/2018 | ......... G02B 6/02085 |

OTHER PUBLICATIONS

Paschotta R., "Soliton Mode Locking," RP Photonics Encyclopedia, 5 pages, [retrieved on Oct. 7, 2019] Retrieved from the internet [URL: https://www.rp-photonics.com/soliton_mode_locking.html].

* cited by examiner

FEMTOSECOND PULSE STRETCHING FIBER OSCILLATOR

RELATED APPLICATIONS

This application is a divisional of U.S. patent application Ser. No. 16/694,741, filed Nov. 25, 2019 (now U.S. Pat. No. 11,233,372), which claims the benefit of U.S. Provisional Patent Application No. 62/866,377, entitled "FEMTOSECOND PULSE STRETCHING FIBER OSCILLATOR," filed on Jun. 25, 2019, the contents of which are incorporated by reference herein in their entireties.

TECHNICAL FIELD

The present disclosure generally relates to a fiber oscillator, and more particularly, to a modelocked fiber laser cavity having a chirped fiber Bragg grating and an optical circulator arranged to enable pulse stretching contemporaneous with outcoupling.

BACKGROUND

Modelocking refers to techniques in optics by which a laser is configured to produce ultrashort pulses that have a pulse duration on the order of picoseconds (psec) or femtoseconds (fsec). Accordingly, a modelocked laser that is operated to produce ultrashort pulses is sometimes referred to as a femtosecond laser and/or the like. In general, a modelocked laser is coupled to a laser cavity that contains a modelocking device (or modelocker), which may include an active element such as an optical modulator, a nonlinear passive element such as a saturable absorber, and/or the like. The modelocking device causes an ultrashort pulse to be formed, which circulates in the laser cavity. In a steady state, effects that influence the circulating pulse are in balance so that pulse parameters are unchanged after each completed round trip, or often even nearly constant throughout each round trip. Each time the pulse hits an output coupler mirror, a usable pulse is emitted, so that a regular pulse train leaves the laser. Assuming a single circulating pulse, a pulse repetition period corresponds to a round-trip time in the laser cavity (typically several nanoseconds), whereas the pulse duration is much shorter. Accordingly, a modelocked laser can have a peak power orders of magnitude higher than an average power.

SUMMARY

According to some implementations, a pulse stretching laser cavity may comprise: an active fiber configured to transmit a pulse, wherein the pulse propagates in a forward direction through the laser cavity and experiences gain in the active fiber; an optical circulator that comprises an input port arranged to receive the pulse after the pulse passes through the active fiber, a first output port, and a second output port arranged to deliver an output pulse; and a chirped fiber Bragg grating that comprises an input end arranged to receive the pulse from the first output port of the optical circulator, wherein the chirped fiber Bragg grating is configured to transmit a first portion of the pulse out a distal end of the chirped fiber Bragg grating where the first portion of the pulse continues to propagate in the forward direction to complete a round trip to the active fiber while a second portion of the pulse is reflected and thereby stretched, and wherein the stretched second portion of the pulse propagates in a reverse direction back to the optical circulator where the stretched second portion of the pulse is diverted to the second output port.

According to some implementations, a pulse stretching laser cavity may comprise: an active fiber configured to transmit a pulse, wherein the pulse propagates in a forward direction through the laser cavity and experiences gain in a first pass through the active fiber; a chirped fiber Bragg grating that comprises an input end arranged to receive the pulse after the pulses passes through the active fiber, wherein the chirped fiber Bragg grating is configured to transmit a first portion of the pulse out a distal end of the chirped fiber Bragg grating where the first portion of the pulse continues to propagate in the forward direction to complete a round trip to the active fiber while a second portion of the pulse is reflected and thereby stretched, and wherein the stretched second portion of the pulse propagates in a reverse direction where the stretched second portion of the pulse experiences gain in a second pass through the active fiber; and an optical circulator arranged to receive the stretched second portion of the pulse after the second pass through the active fiber and output the stretched second portion of the pulse.

According to some implementations, a pulse stretching laser cavity may comprise: an active fiber; a reflective modelocker device arranged to reflect a pulse into the active fiber; an optical circulator that comprises an input port and a plurality of output ports, wherein the plurality of output ports comprise a first output port arranged to receive the pulse after the pulse passes through the active fiber and to transmit the pulse via a second output port; and a chirped fiber Bragg grating that comprises an input end arranged to receive the pulse from the second output port of the optical circulator, wherein the chirped fiber Bragg grating is configured to transmit a first portion of the pulse out a distal end of the chirped fiber Bragg grating and into the input port of the optical circulator, and wherein the chirped fiber Bragg grating is configured to reflect and thereby stretch a second portion of the pulse back into the second output port of the optical circulator where the stretched second portion of the pulse is diverted to a third output port arranged to deliver an output pulse.

DETAILED DESCRIPTION

Figure 1:
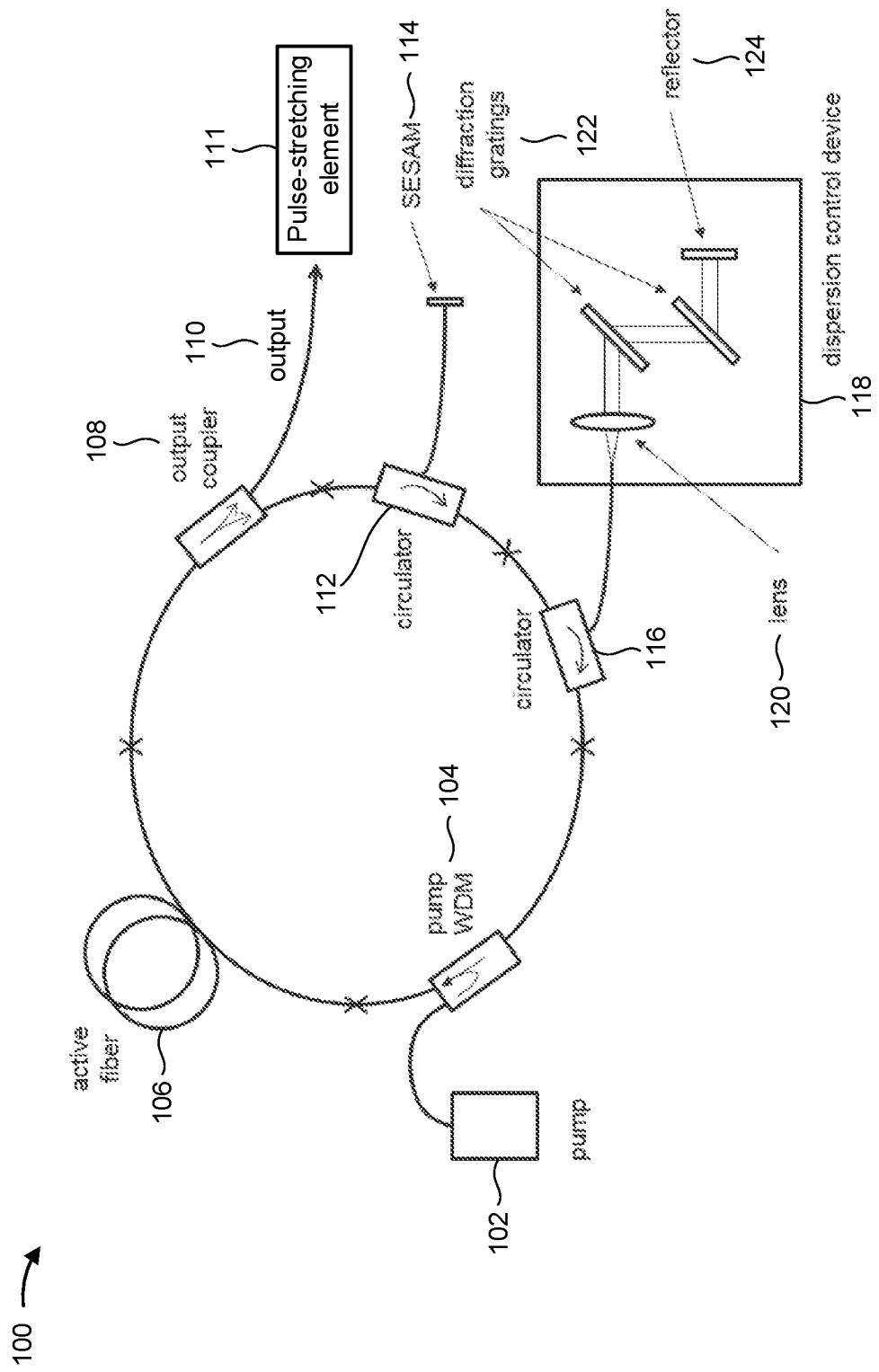
FIG. 1 is a diagram of an example modelocked oscillator.

The following detailed description of example implementations refers to the accompanying drawings. The same reference numbers in different drawings may identify the same or similar elements.

Short-pulse fiber oscillators typically operate with sufficiently high peak powers that nonlinear effects are strong during pulse propagation in the fiber. While these nonlinearities are expected and typically useful in generating short pulses by the oscillator, the nonlinearities may be detrimental to overall system performance after the pulse is outcoupled from the oscillator. For example, in femtosecond lasers used in industrial, medical, and/or other applications, the pulse is typically stretched using a technique known as chirped-pulse amplification in order to reduce the peak power and the nonlinearities prior to launch into amplifiers that bring the pulse energy from nanojoule (nJ) levels up to microjoule or millijoule levels. The stretching technique can increase the pulse duration from less than 1 picosecond (psec) or less than 10 psec up to a pulse duration greater than 100 psec or greater than 1 nanosecond (nsec).

Accordingly, the stretching technique can reduce the peak power by factors from 10× to greater than 1000× and substantially reduce the nonlinearities. However, in systems that stretch a pulse using the chirped-pulse amplification technique or other similar techniques, a remaining length of optical fiber typically runs from the oscillator output coupler to the pulse stretcher, and a substantial amount of detrimental nonlinear phase can be accumulated in the remaining length of the optical fiber that runs from the oscillator output coupler to the pulse stretcher. This nonlinearity can limit the power at which the oscillator can be operated, can limit the final compressed output pulse duration, and/or the like. In general, the level of nonlinearity may be characterized by a B-integral, which for a length L of passive silica fiber is given by:

$$B = 2\pi n_2 I\, L/\lambda$$

where $n_2 = 3 \times 10^{-20}$ m²/W, I is an intensity of a light in the fiber core, and $\lambda$ is a wavelength. For example, the above expression can be used to calculate that 1 kW of 1030 nm light in a polarization-maintaining 980 nanometer (PM-980) fiber results in a B-integral of about $2\pi$, which is roughly the level where nonlinear effects upon the pulse may become significant.

Accordingly, a typical soliton or quasi-soliton modelocked fiber oscillator may generally operate in a range of up to 0.1 to 1.0 nJ energy per pulse, with a pulse duration of 100 femtoseconds (fsec) to 1 psec, thus with peak powers in a 1 kW regime. Typical similariton- or All-Normal Dispersion (ANDi)-modelocked fiber oscillators intrinsically generate a somewhat stretched (e.g., chirped) pulse, typically in a range from 1 psec to 10 psec, which may be compressible down into a range of less than 1 psec to enable operation with somewhat higher pulse energies of 1.0 to 10 nJ per pulse while remaining in the 1 kW regime. If any of these lasers were to be operated at higher pulse energy levels, the nonlinearity would grow accordingly, and the output pulses may be degraded due to having to traverse an output fiber on an order of typically 1 meter or more prior to stretching. Accordingly, the growing nonlinearity may result in an unacceptable pulse-following recompression (e.g., a substantial pulse pedestal, a substantially longer pulse duration, a pulse broken up into multiple sub-pulses, and/or the like).

Some implementations described herein relate to a modelocked fiber laser cavity having a configuration in which a chirped fiber Bragg grating (CFBG) and an optical circulator are arranged to enable pulse stretching contemporaneous with outcoupling, thereby eliminating propagation of an unstretched pulse in an output fiber to a stretcher, the corresponding accumulation of deleterious nonlinear phase prior to stretching, and/or the like. Examples of modelocked fiber laser cavities in which a CFBG and an optical circulator are arranged to enable pulse stretching contemporaneous with outcoupling are described below.

FIG. 1 is a diagram of an example modelocked oscillator 100. For example, in some implementations, the modelocked oscillator 100 may be a soliton modelocked ring oscillator, a quasi-soliton modelocked ring oscillator, and/or the like. In some implementations, the modelocked oscillator 100 may be designed to operate polarized, using polarizing or polarization-maintaining fiber and components. Additionally, or alternatively, in some implementations, the modelocked oscillator 100 may be unpolarized.

As shown in FIG. 1, the modelocked oscillator 100 may include a pump 102 and a pump wavelength division multiplexer (WDM) 104 configured to generate energy that causes a pulse to be transmitted in a forward direction (e.g., clockwise) through a ring cavity. For example, the pulse may be generated spontaneously from noise in the ring cavity, and the pulse may be shaped by one or more elements in the ring cavity as the pulse makes round trips through the ring cavity. Accordingly, as shown in FIG. 1, the pulse may circulate in the clockwise direction around the ring cavity and propagate through an active fiber 106 where the pulse experiences gain (e.g., is amplified). For example, the active fiber 106 may act as a gain medium to transmit the pulse, and may include a glass fiber doped with rare earth ions such as erbium, neodymium, ytterbium, praseodymium, thulium, and/or the like.

As shown in FIG. 1, after passing through the active fiber 106, the pulse then passes through an output coupler 108 having a first output port that couples onto an output fiber 110 and a second output port that couples into the ring cavity. Accordingly, after passing through the output coupler 108, the pulse may pass through a reflective modelocker device 114 (e.g., a semiconductor saturable absorber mirror (SESAM)) via a first optical circulator 112, and through a double-pass dispersion control device 118 via a second optical circulator 116 before returning to the active fiber 106. For example, as shown in FIG. 1, the double-pass dispersion control device 118 may include a lens 120, a pair of diffraction gratings 122, and a reflector 124 that are arranged to provide a negative group-delay dispersion (GDD). In order to operate in the soliton regime, a total GDD in the cavity should generally be negative or zero. Accordingly, the double-pass dispersion control device 118 may be arranged to more than offset a positive GDD from an entire fiber length in the cavity to enable operation in the soliton regime. In FIG. 1, the output coupler 108 may be an all-fiber fused coupler, a pigtailed partial reflector type device, and/or the like. In general, the output coupler 108 may operate according to one or more output coupling parameters that depend on specifics of a design of the modelocked oscillator 100. For example, in some implementations, the output coupler 108 may operate according to one or more output coupling parameters in a range from about 20% to about 80% output coupling. In typical chirped-pulse amplification systems, the output pulses delivered through the output fiber 110 are subsequently stretched in duration by a pulse-stretching element 111 such as a CFBG, a volume Bragg grating, a diffraction-grating pair, and/or the like prior to pulse amplification and compression.

As indicated above, FIG. 1 is provided merely as one or more examples. Other examples may differ from what is described with regard to FIG. 1.

Figure 2A:
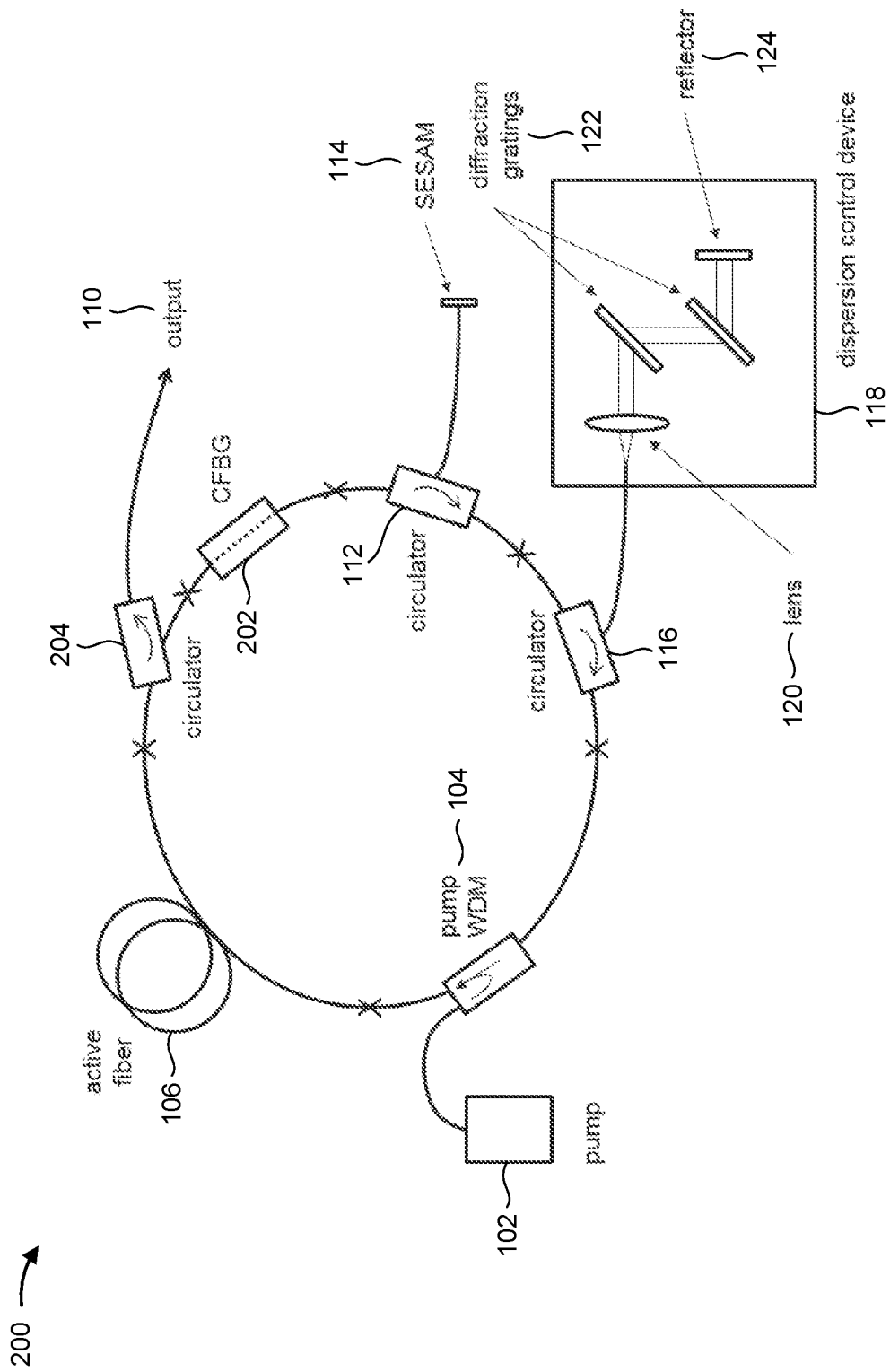
FIGS. 2A-2B are diagrams of one or more example implementations of a modelocked oscillator including a chirped fiber Bragg grating (CFBG) and an optical circulator arranged to enable pulse stretching contemporaneous with outcoupling in a ring cavity.
Figure 2B:
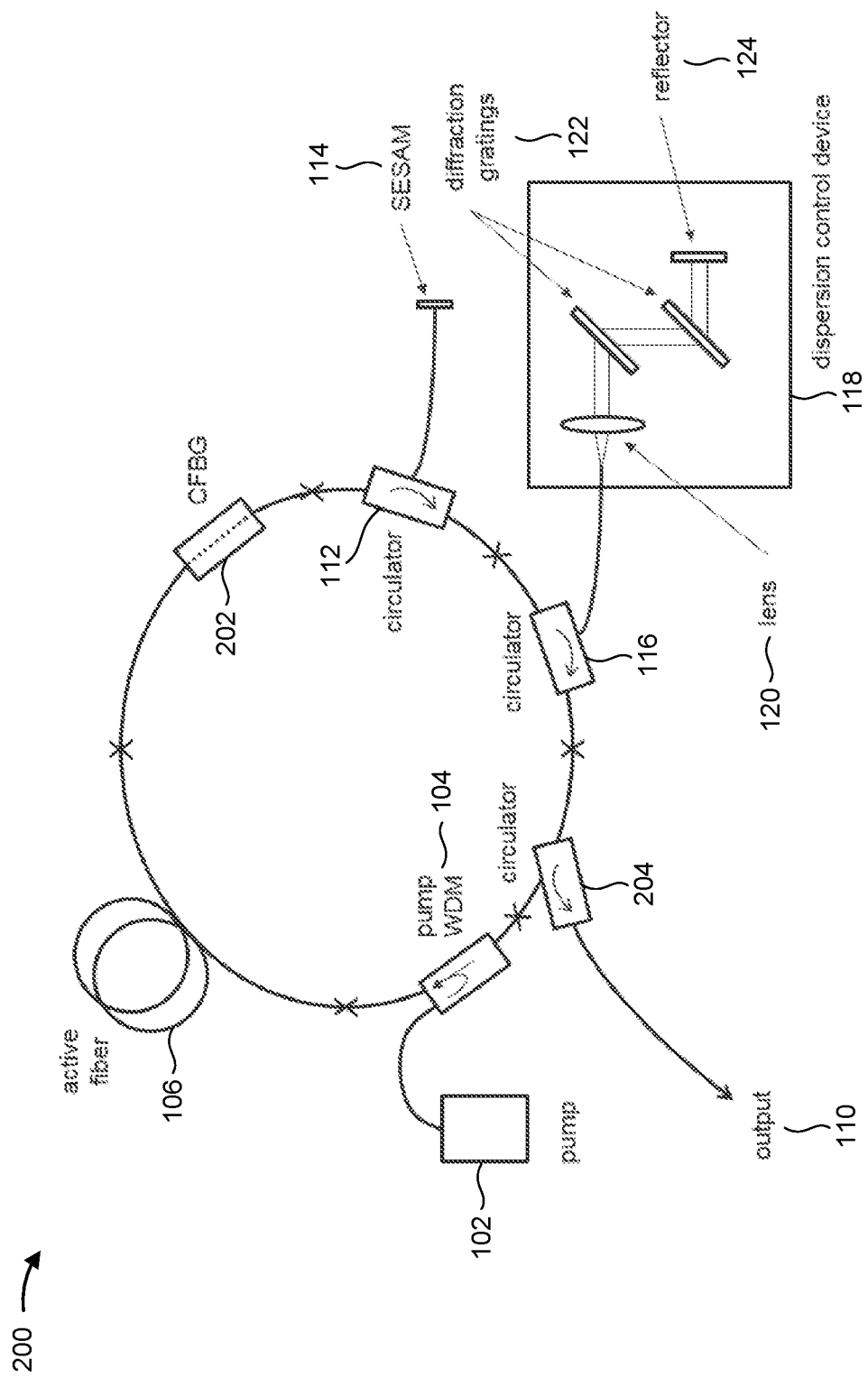

FIGS. 2A-2B are diagrams of one or more example implementations 200 of a modelocked oscillator including a chirped fiber Bragg grating (CFBG) 202 and an optical circulator 204 arranged to enable pulse stretching contemporaneous with outcoupling in a ring cavity. For example, example implementation(s) 200 may include a pulse stretching fiber oscillator (or laser cavity) in which a pulse is spontaneously generated from noise in the laser cavity and shaped by one or more elements in the laser cavity (e.g., SESAM 114, dispersion control device 118, nonlinearity, and/or the like) as the pulse makes many round trips through the laser cavity. As shown in FIG. 2A, the pulse stretching fiber oscillator (or laser cavity) includes a pump 102 and a pump WDM 104 arranged to generate energy that causes the pulse to propagate into an active fiber 106 of the laser cavity (e.g., a ring cavity in the illustrated example), with the pulse propagating in a forward (e.g., clockwise) direction through the laser cavity and experiencing gain in the active fiber 106. Furthermore, as shown in FIG. 2A, the laser cavity includes the CFBG 202 and the optical circulator 204 (e.g., in contrast to the output coupler 108 in the modelocked oscillator 100 of FIG. 1). In some implementations, the optical circulator 204 includes an input port arranged to receive the pulse after the pulse passes through the active fiber 106, a first output port that couples into the laser cavity, and a second output port that leads to an output fiber 110. Furthermore, as shown, the CFBG 202 includes an input end arranged to receive the pulse from the first output port of the optical circulator 204. In some implementations, as described herein, the CFBG 202 may be configured to transmit a first portion of the pulse out a distal end of the CFBG 202 and into the laser cavity where the first portion of the pulse continues to propagate in the forward direction while a second portion of the pulse is reflected and thereby stretched. In some implementations, as further described herein, the second portion of the pulse that is reflected and thereby stretched propagates in a reverse (e.g., counterclockwise) direction back to the optical circulator 204 where the second portion of the pulse is diverted to the second output port that leads to the output fiber 110.

In general, a fiber Bragg grating (FBG) is a particular type of distributed Bragg reflector constructed in a short segment of optical fiber to reflect particular wavelengths of light and transmit all others. This effect is typically achieved by creating a periodic variation in a refractive index of a fiber core, which generates a wavelength-specific dielectric mirror. An FBG can therefore be used as an inline optical filter to block certain wavelengths, or as a wavelength-specific reflector. The CFBG 202 is a specific type of FBG in which a grating that is inscribed in a fiber core has a non-uniform pitch, causing different spectral components of an input pulse to be reflected at different locations along the grating, resulting in GDD. For example, in some implementations, the non-uniform pitch of the CFBG 202 may cause first and second spectral components of the second portion of the pulse (e.g. red and blue components) to be reflected at first and second locations along the CFBG 202. CFBGs are often used in a reflective-only mode for pulse stretching, where the input pulse enters from one end, the reflected and stretched pulse exits from that same end, and any unreflected light exits from the distal end of the fiber and is typically discarded. A circulator may be used at the input end to separate the output light from the input (similar to the use of a circulator with the SESAM and the dispersion control device, as described above with reference to FIG. 1). As shown in FIG. 2, the CFBG 202 is incorporated into the ring cavity of the modelocked oscillator.

In some implementations, as shown in FIG. 2A, the CFBG 202 may be designed for a desired or optimal output coupling according to a design of the ring cavity of the modelocked oscillator. For example, in some implementations, the CFBG 202 may be configured to reflect the second portion of the pulse according to a reflectivity or outcoupling fraction that is based on one or more output coupling parameters (e.g., from about 20% to about 80% output coupling). Furthermore, as shown in FIG. 2A, the optical circulator 204 may be connected in the ring cavity in an orientation with the first output port (or output leg) coupling into the ring cavity through the CFBG 202, and the second output port (or output leg) coupling to the output fiber 110, which is opposite to typical configurations in which the first output port leads to a reflective device (e.g., a SESAM or a conventionally arranged CFBG) and the second output port leads to an ongoing beam propagation direction. Further, a distal end of the CFBG 202 connects to the rest of the ring cavity, rather than being left unused as in a typical CFBG implementation.

For example, as shown in FIG. 2A, a beam propagation stage coupled between the active fiber 106 and the distal end of the CFBG 202 includes one or more devices arranged to propagate the first portion of the pulse in the forward (clockwise) direction from the distal end of the CFBG 202 to the active fiber 106. For example, the one or more devices in the beam propagation stage, which are configured in a similar manner as described above with reference to FIG. 1, may include an optical circulator 112 that has an input port coupled to the distal end of the CFBG 202, a first output port that leads to a reflective modelocker device 114 (e.g., a SESAM), and a second output port that leads in an ongoing beam propagation direction. In this example, the one or more devices in the beam propagation stage further include the optical circulator 116 with an input port coupled to the second output port of the optical circulator 112, a first output port that leads to the dispersion control device 118, and a second output port that leads in the ongoing beam propagation direction and towards the active fiber 106.

Accordingly, in operation, a clockwise-traveling pulse from the active fiber 106 may generally pass through the optical circulator 204 and out the first output port to the CFBG 202, where some of the pulse is transmitted out the distal end of the CFBG 202 unstretched and continues through the cavity. Furthermore, some of the pulse is reflected by the CFBG 202 and is thereby stretched. This stretched pulse propagates backward to the optical circulator 204, where the stretched pulse is diverted to the second output port, which leads into the output fiber 110. In this way, because the output pulse is stretched contemporaneously with being separated from the forward-going pulse in the CFBG 202, the output pulse does not propagate in fiber in an unstretched state, and peak powers of the output pulse are substantially decreased. In this way, little or no nonlinearity is experienced by the output pulse. Additionally, or alternatively, using the CFBG 202 and the optical circulator 204 within the ring cavity of the modelocked oscillator reduces optical loss that is typically incurred with a conventional outcoupler and a standalone CFBG and circulator. In this way, the oscillator and stretcher combination delivers higher output powers, reducing a need for additional amplification stages and improving the temporal and/or spectral quality of the pulse, which leads to higher output pulse energy, shorter pulses, superior pulse quality following amplification and compression, and/or the like.

In some implementations, the arrangement of the SESAM 114 and the dispersion control device 118 as shown in FIG. 2A may be replaced by an optical assembly that provides dispersion control, modelocking, spectral filtering, and/or the like in the laser cavity. For example, the optical assembly may generally have a similar configuration as the dispersion control device 118, and may further including a focusing optic (e.g., a lens, a concave mirror, and/or the like) positioned between the pair of diffraction gratings 122 and the reflector 124, which may be a modelocking device such as a SESAM positioned at a reflective end of the optical assembly. Accordingly, the focusing optic may create a beam waist at the reflector 124 and cause the beam to be inverted on a second pass through the pair of diffraction gratings 122. In this way, by causing the beam to be inverted upon the second pass through the pair of diffraction gratings 122, the optical assembly may produce a temporally and spatially dispersed output that provides spectral filtering in addition to dispersion control and modelocking in the laser cavity. Accordingly, in this case, the SESAM 114 may be omitted and the focusing optic may be included in the dispersion control device 118 between the pair of diffraction gratings 122 and the reflector 124 to provide dispersion control, modelocking, spectral filtering, and/or the like. Furthermore, because the CFBG 202 may have lower transmissivity near the center wavelength than at the flanks of the laser spectral distribution, tending to drive the laser to lase away from the center wavelength, a spectral bandpass filter may be provided in the cavity to compensate this transmissivity distribution of the CFBG 202. For example, in a ring cavity configuration (e.g., as illustrated in FIG. 2A), such a spectral bandpass filter can be a transmissive element, a reflective element with a circulator, an optical assembly that provides spectral filtering through spatial dispersion as described above, and/or the like.

FIG. 2B illustrates another possible design for the modelocked oscillator in which the CFBG 202 and the optical circulator 204 are arranged to enable an extra gain pass. For example, in FIG. 2B, the optical circulator 204 is located in a position counterclockwise from the active fiber 106 and the pump WDM 104, which may improve performance relative to the arrangement of the modelocked oscillator as shown in FIG. 2A.

Accordingly, in FIG. 2B, the optical circulator 204 used for output coupling is located in a position counterclockwise from the active fiber 106 and the pump WDM 104 and clockwise from the beam propagation stage that includes the optical circulator 112, reflective modelocker device 114, optical circulator 116, and dispersion control device 118. As a result, a stretched output pulse traveling counterclockwise from the CFBG 202 traverses the active fiber 106 before being outcoupled by the optical circulator 204. Accordingly, in FIG. 2B, the CFBG 202 includes an input end arranged to receive the pulse after the pulses passes through the active fiber 106, and the CFBG 202 may transmit a first portion of the pulse out a distal end of the CFBG 202 and continuing through the laser cavity where the first portion of the pulse continues to propagate in the forward (e.g., clockwise) direction while a second portion of the pulse is reflected and thereby stretched. In some implementations, the stretched second portion of the pulse propagates in a reverse (e.g., counterclockwise) direction where the stretched second portion of the pulse experiences further gain in a second pass through the active fiber 106, and the optical circulator 204 receives the stretched second portion of the pulse after the second pass through the active fiber 106 and outputs the stretched second portion of the pulse onto the output fiber 110.

In this way, because the active fiber 106 is operating with a substantial single-pass gain of typically 3-15 dB (e.g., 10 dB) in order for the modelocked oscillator to run above a threshold, the stretched output pulse may experience a corresponding gain (e.g., 10 dB) prior to exiting the ring cavity. Thus, for example, a soliton oscillator may be able to generate stretched pulses compressible to 200 fsec with energy 2 nJ instead of 0.2 nJ as in a conventional soliton oscillator limited by a 1 kW peak power. Furthermore, in this way, a gain experienced by the pulse from the active fiber 106 may not be high enough to reach a threshold of nonlinearity. In particular, the gain is on the order of 10×, whereas the stretching is on the order of 1000×, whereby the peak power is decreased ~100× relative to a natural level in the cavity (which is near the threshold of nonlinearity). Furthermore, while the stretching effect is mathematically equivalent to dispersion, the stretching effect is substantially greater than the natural dispersion of fiber lengths of one or two meters. Accordingly, any fiber dispersion that occurs in the modelocked oscillator shown in FIG. 2B or in subsequent stages of fiber amplification may simply add to the stretched pulse duration (or subtract from the stretched pulse duration, depending on the sign of the stretching and whether the subsequent stages of fiber amplification are operating in a normal or anomalous fiber dispersion regime). In any case, a final pulse compressor at the output end of the laser system (e.g., coupled to the output fiber 110) can be adjusted to reduce the pulse duration such that the pulses would be nearly Fourier-transform-limited (e.g., the pulses may exhibit a shortest possible pulse duration given a spectral bandwidth of the pulses). Because the output pulse is already stretched, the increased power is unlikely to cause significant added nonlinearity. In some implementations, a power at which the pump 102 is operated may be increased to account for this additional extraction from the active fiber 106. Other than that, the presence of the counterclockwise-traveling stretched pulse may have little to no effect on normal modelocking behavior of the clockwise-traveling short pulse. Overall, the system may deliver greatly increased power levels with decreased levels of nonlinearity compared to a typical oscillator.

Accordingly, whereas optical circulators are typically oriented in a manner whereby a middle leg goes to a component that is double-passed, some implementations described herein may arrange the optical circulator 204 in an orientation for output coupling. Furthermore, while an intra-cavity CFBG 202 may be arranged to provide a small amount of dispersion for an oscillating beam in some cases (similar to the diffraction grating pair 122), CFBGs are conventionally arranged to reflect the oscillator beam (e.g., as an end reflector of a linear cavity), with the transmitted beam potentially used as a (non-stretched) outcoupled beam. In contrast, some implementations described herein provide an arrangement in which the transmitted beam, which is nominally not dispersed by the CFBG 202, remains in the cavity of the modelocked oscillator, while the reflected beam may be used as the output. Furthermore, dispersion of a "stretcher" CFBG, such as the one used in some implementations described herein, is substantially greater than that of an intra-cavity dispersing CFBG (e.g., stretching a 500 fsec pulse to a 200-500 psec pulse, as opposed to a few psec for an intra-cavity dispersing CFBG). The oscillator output is normally a few psec or less, and any major stretching for chirped-pulse amplification occurs separately. Accordingly, some implementations described herein may incorporate the pulse stretching into the cavity structure, which may eliminate propagation through a connecting fiber from oscillator to stretcher.

Furthermore, some implementations described herein may be useful for soliton or quasi-soliton oscillators because soliton modelocking tends to be limited in pulse energy due to a short, unchirped pulse output. Accordingly, some implementations described herein may combine advantages of soliton modelocking (e.g., stability, robustness, a clean pulse profile, and/or the like) with greatly increased output power. Furthermore, while soliton oscillators generally create pulses with squared hyperbolic secant ($sech^2$) temporal and spectral profiles, a different profile (e.g., a parabolic or quasi-parabolic stretched pulse temporal profile) may be desired in some case. Accordingly, in some implementations, pulse shaping can be achieved using an appropriately tailored spectral filter or temporal modulator applied to an output beam in or after the second output leg of the optical circulator 204 used for outcoupling in order to generate the desired temporal and/or spectral profile. Additionally, or alternatively, such pulses can be generated directly using different types of fiber laser oscillators (e.g., a similariton oscillator). Some implementations described herein may be applied to such oscillators as well.

As indicated above, FIGS. 2A-2B are provided merely as one or more examples. Other examples may differ from what is described with regard to FIGS. 2A-2B. For example, while example implementation(s) 200 focused on a pulse stretching design in which the CFBG 202 and the optical circulator 204 are arranged in a ring cavity, some implementations may apply the pulse stretching design to linear cavities, hybrid ring and linear cavities, and/or the like.

Figure 3:
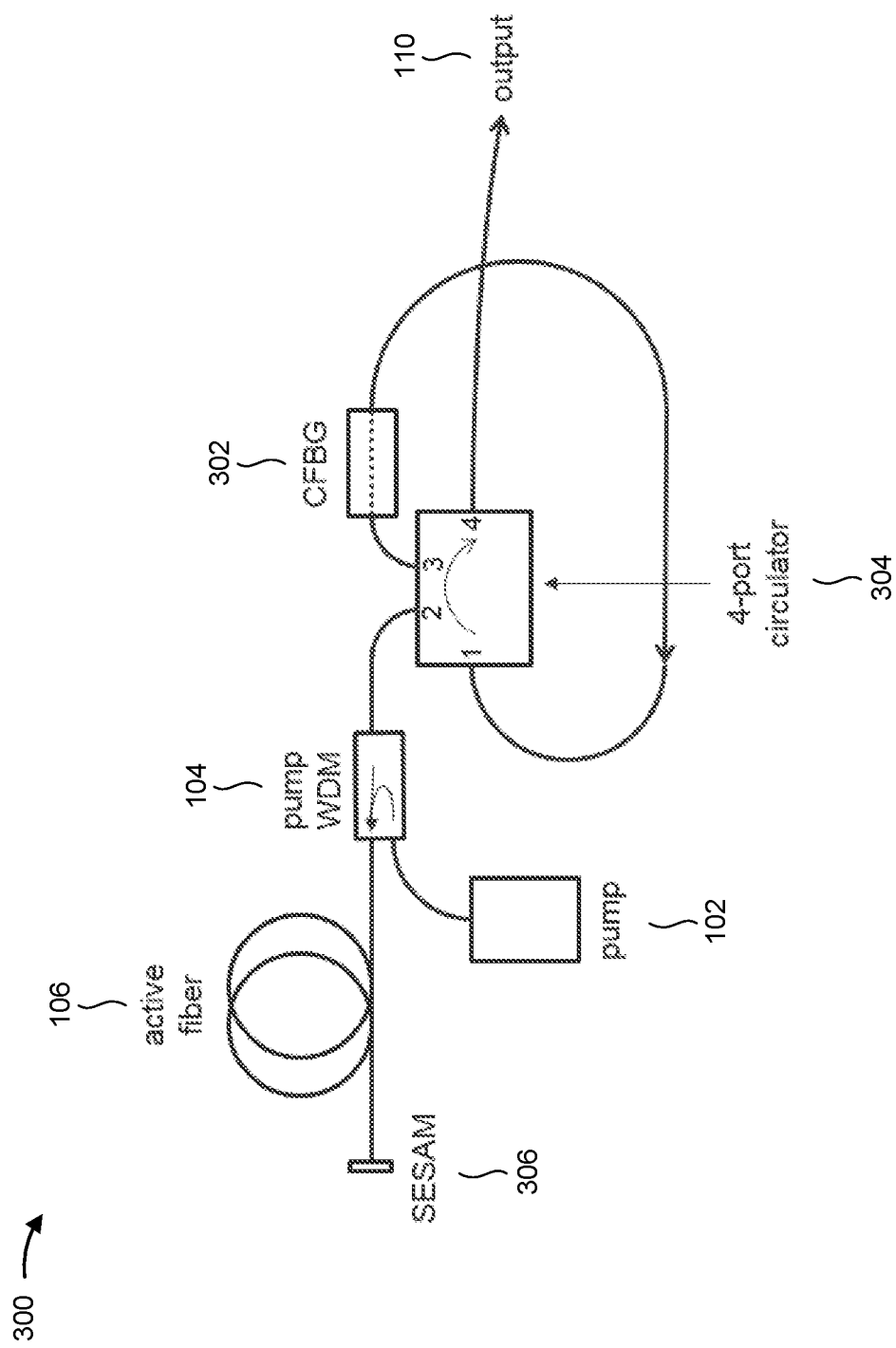
FIG. 3 is a diagram of an example implementation of a modelocked oscillator including a CFBG and an optical circulator arranged to enable pulse stretching contemporaneous with outcoupling in a linear cavity.

For example, FIG. 3 is a diagram of an example implementation 300 of a modelocked oscillator including a CFBG 302 and an optical circulator 304 arranged to enable pulse stretching contemporaneous with outcoupling in a linear laser cavity. More particularly, as shown in FIG. 3, the modelocked oscillator may be configured as a pulse stretching fiber oscillator that includes a reflective modelocker device (e.g., a SESAM) 306 arranged to reflect a pulse (e.g., a pulse that is spontaneously generated from noise in the linear laser cavity) into an active fiber 106 of the linear laser cavity. As further shown in FIG. 3, the optical circulator 304 is a four-port circulator that has an input port (labelled '1') and a plurality of output ports. For example, the output ports include a first output port (labelled '2') arranged to receive the pulse after the pulse passes through the active fiber 106 and to transmit the pulse via a second output port (labelled '3'). The CFBG 302 may include an input end arranged to receive the pulse from the second output port of the optical circulator 304, and the CFBG 302 may transmit a first portion of the pulse out a distal end of the CFBG 302 and into the input port of the optical circulator 304. Furthermore, the CFBG 302 may reflect and thereby stretch a second portion of the pulse back into the second output port of the optical circulator 304 where the stretched second portion of the pulse is diverted to a third output port (labelled '4') that leads to the output fiber 110. In some implementations, the first portion of the pulse may be directed out of the first output port of the optical circulator 304 to make another pass through the active fiber 106 towards the reflective modelocker device 306.

Accordingly, in one round trip through the modelocked oscillator shown in FIG. 3, a pulse follows a path that starts from the reflective modelocker device 306. The pulse then passes through the active fiber 106 and into the first output port (port 2) of the optical circulator 304. The pulse is then transmitted to the second output port (port 3) of the optical circulator 304 and into the CFBG 302, and a first portion of the pulse transmitted through the CFBG 302 proceeds to the input port (port 1) of the optical circulator 304 where the first portion of the pulse is directed out of the first output port (port 2) to make another pass through the active fiber 106 and back to the reflective modelocker device 306. A second portion of the pulse that is reflected by the CFBG 302 is stretched and coupled back into the second output port (port 3) of the optical circulator 304 and out of the third output port (port 4) of the optical circulator 304 to form a useful output pulse.

As indicated above, FIG. 3 is provided merely as one or more examples. Other examples may differ from what is described with regard to FIG. 3.

The foregoing disclosure provides illustration and description, but is not intended to be exhaustive or to limit the implementations to the precise forms disclosed. Modifications and variations may be made in light of the above disclosure or may be acquired from practice of the implementations.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:
1. A pulse stretching laser cavity, comprising:
an active fiber configured to transmit a pulse,
  wherein the pulse propagates in a forward direction through the pulse stretching laser cavity and experiences gain in a first pass through the active fiber;
a chirped fiber Bragg grating that comprises an input end arranged to receive the pulse after the pulse passes through the active fiber,
  wherein the chirped fiber Bragg grating is configured to transmit a first portion of the pulse out a distal end of the chirped fiber Bragg grating where the first portion of the pulse continues to propagate in the forward direction to complete a round trip to the active fiber while a second portion of the pulse is reflected and thereby stretched, and
  wherein the second portion of the pulse propagates in a reverse direction where the second portion of the pulse experiences gain in a second pass through the active fiber; and
an optical circulator arranged to receive the second portion of the pulse after the second pass through the active fiber and output the second portion of the pulse.
2. The pulse stretching laser cavity of claim 1, further comprising:

a beam propagation stage coupled between the optical circulator and the distal end of the chirped fiber Bragg grating,
wherein the beam propagation stage comprises one or more devices arranged to propagate the first portion of the pulse in the forward direction.

3. The pulse stretching laser cavity of claim 2, wherein the optical circulator is arranged between a pump wavelength division multiplexer and the beam propagation stage.

4. The pulse stretching laser cavity of claim 1, wherein the optical circulator is coupled to a pulse compressor configured to reduce a duration of the second portion of the pulse.

5. The pulse stretching laser cavity of claim 1, wherein the second portion of the pulse has one or more of a squared hyperbolic secant or a parabolic temporal profile.

6. The pulse stretching laser cavity of claim 1, wherein the second portion of the pulse is reflected and thereby stretched contemporaneously with the chirped fiber Bragg grating separating the first portion of the pulse that continues to propagate in the forward direction.

7. A laser cavity, comprising:
an active fiber configured to transmit a pulse,
wherein the pulse propagates in a forward direction through the laser cavity and experiences gain in a first pass through the active fiber;
a pulse-stretching element that is configured to receive the pulse after the pulse passes through the active fiber,
wherein a first portion of the pulse continues to propagate in the forward direction to complete a round trip to the active fiber while a second portion of the pulse is reflected and thereby stretched, and
wherein the second portion of the pulse propagates in a reverse direction where the second portion of the pulse experiences gain in a second pass through the active fiber; and
an optical circulator arranged to receive the second portion of the pulse after the second pass through the active fiber and output the second portion of the pulse.

8. The laser cavity of claim 7, wherein the pulse-stretching element is a fiber Bragg grating.

9. The laser cavity of claim 7, further comprising:
a beam propagation stage coupled between the optical circulator and the pulse-stretching element,
wherein the beam propagation stage is configured to propagate the first portion of the pulse in the forward direction.

10. The laser cavity of claim 9, wherein the beam propagation stage comprises one or more additional optical circulators, a reflective modelocker device, and a dispersion control device.

11. The laser cavity of claim 7, further comprising:
a pulse compressor coupled to the optical circulator and configured to reduce a duration of the second portion of the pulse.

12. The laser cavity of claim 7, wherein the second portion of the pulse has squared hyperbolic secant temporal and spectral profiles.

13. The laser cavity of claim 7, wherein the pulse-stretching element is configured to contemporaneously stretch the second portion of the pulse and allow the first portion of the pulse to propagate in the forward direction.

14. A laser cavity, comprising:
an active fiber configured to transmit a pulse,
wherein the pulse propagates in a forward direction through the laser cavity and experiences gain in a first pass through the active fiber; and
a pulse-stretching element that is configured to receive the pulse after the pulse passes through the active fiber,
wherein a first portion of the pulse continues to propagate in the forward direction to complete a round trip to the active fiber while a second portion of the pulse is stretched, and
wherein the second portion of the pulse propagates in a reverse direction where the second portion of the pulse experiences gain in a second pass through the active fiber and is thereafter output by an optical circulator.

15. The laser cavity of claim 14, wherein the pulse-stretching element is a chirped fiber Bragg grating.

16. The laser cavity of claim 14, further comprising:
a beam propagation stage configured to propagate the first portion of the pulse in the forward direction.

17. The laser cavity of claim 14, further comprising at least one of an additional optical circulator, a reflective modelocker device, or a dispersion control device.

18. The laser cavity of claim 14, wherein the second portion of the pulse has one or more of a squared hyperbolic secant, a parabolic temporal profile, or a quasi-parabolic temporal profile.

19. The laser cavity of claim 14, wherein the pulse-stretching element is configured to contemporaneously stretch the second portion of the pulse and allow the first portion of the pulse to propagate in the forward direction.

20. The laser cavity of claim 14, further comprising:
the optical circulator.

* * * * *